United States Patent
Denning, Jr. et al.

(10) Patent No.: US 8,798,573 B2
(45) Date of Patent: Aug. 5, 2014

(54) MONITORING ACTIVITIES OF DAILY LIVING USING RADIO FREQUENCY EMISSIONS

(75) Inventors: Donald R Denning, Jr., Shirley, MA (US); Benjamin Kuris, Brookline, MA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 1302 days.

(21) Appl. No.: 11/843,350

(22) Filed: Aug. 22, 2007

(65) Prior Publication Data
US 2009/0054028 A1 Feb. 26, 2009

(51) Int. Cl.
 *H04M 11/04* (2006.01)
 *G08B 1/08* (2006.01)

(52) U.S. Cl.
 USPC ............ 455/404.2; 340/539.22; 340/539.26

(58) Field of Classification Search
 CPC ... H04W 4/02; H04W 84/18; H04W 52/0251; G06K 19/0717
 USPC .............. 455/404.2; 340/539.22, 539.26
 See application file for complete search history.

(56) References Cited

U.S. PATENT DOCUMENTS

| | | | |
|---|---|---|---|
| 2004/0030531 A1* | 2/2004 | Miller et al. | 702/182 |
| 2005/0145688 A1* | 7/2005 | Milenkovic et al. | 235/375 |
| 2007/0080797 A1* | 4/2007 | Jung et al. | 340/500 |
| 2007/0109121 A1* | 5/2007 | Cohen | 340/539.26 |
| 2008/0002606 A1* | 1/2008 | Cheung et al. | 370/328 |
| 2008/0084295 A1* | 4/2008 | Libby | 340/539.22 |
| 2008/0287121 A1* | 11/2008 | Ebrom et al. | 455/426.1 |

\* cited by examiner

*Primary Examiner* — Omoniyi Obayanju
(74) *Attorney, Agent, or Firm* — Pillsbury Winthrop Shaw Pittman LLP

(57) ABSTRACT

Briefly, in accordance with one or more embodiments, a monitoring system is capable of monitoring the Activities of Daily Living (ADL) of one or more persons occupying a building. The monitoring system includes an information handling system having a radio-frequency (RF) scanner capable of scanning the RF ambient environment of the building. When an individual uses devices in the building that emit RF signals or emissions, the RF signals are detected by the RF scanner and analyzed by the information handling system. The characteristics of the detected RF signals are compared to a database of signature of known devices. If a detected RF signal matches the signature of a known device, the use of the device is logged into a database for ADL analysis.

19 Claims, 4 Drawing Sheets

MONITORING ACTIVITIES OF DAILY LIVING USING RADIO FREQUENCY EMISSIONS

BACKGROUND

In some healthcare environments, certain individuals may benefit from monitoring of their Activities for Daily Living (ADL). Typically, systems that have been implemented for such ADL monitoring utilize various specialized equipment having sensors, monitors, video surveillance, or other devices that are carried on the body of the monitored individual or that are otherwise invasive in the ordinary everyday life and activities of the monitored individual.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
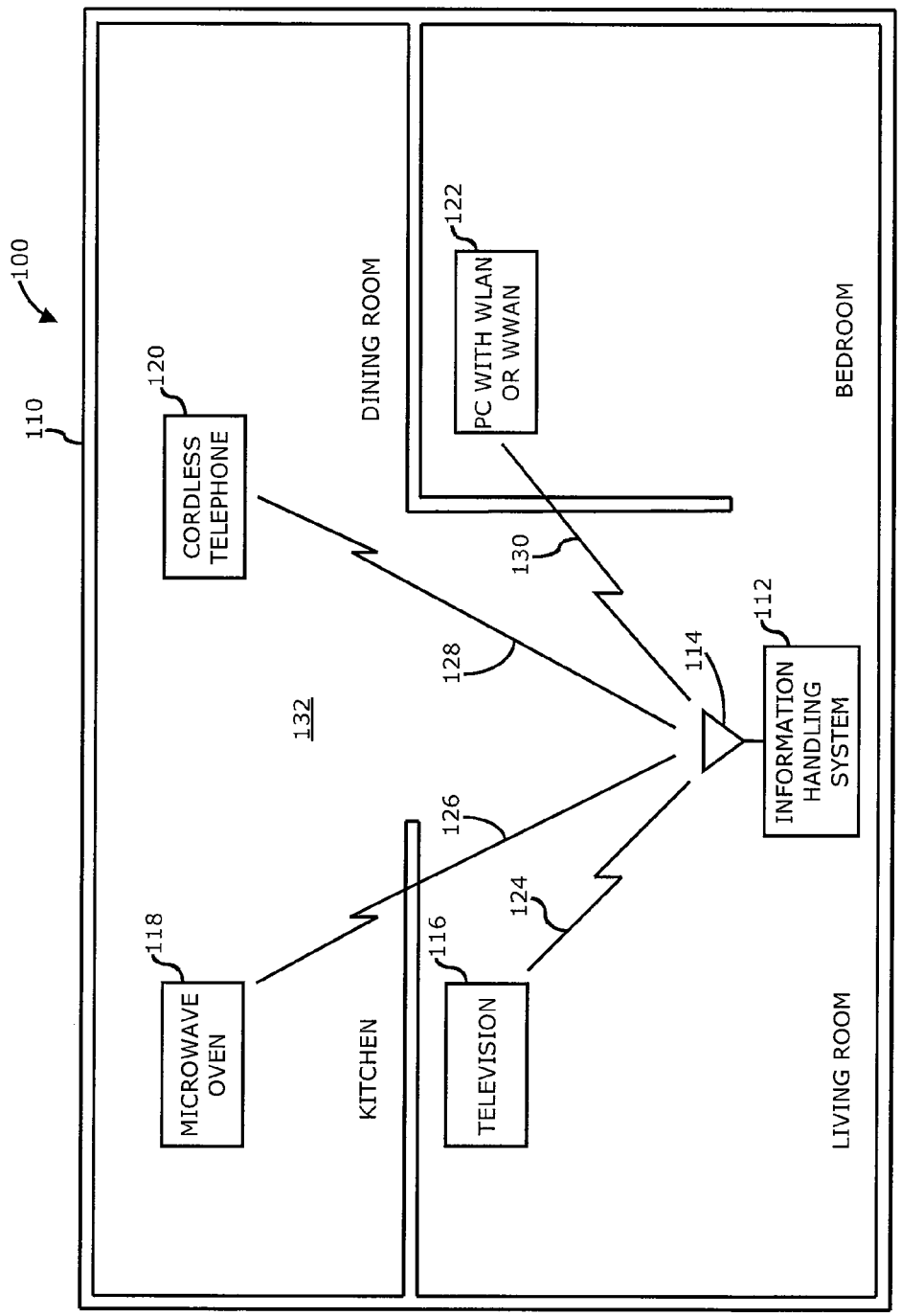
FIG. 1 is a diagram of a building such as a house having a radio-frequency ambient environment capable of being monitored in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a building such as a house having a radio-frequency ambient environment capable of being monitored in accordance with one or more embodiments will be discussed. As shown in FIG. 1, a monitoring system 100 may be capable of monitoring Activities of Daily Living (ADL) of one or more individuals inhabiting a building 110 which may comprise, for example, a house, apartment, condominium. Such a building may include various rooms, such as a kitchen, dining room, living room, bedroom and so on. Monitoring system 100 may include an information handling system 112 having a wireless radio-frequency (RF) scanner and/or spectrum analyzer capable of receiving RF signals in the RF ambient environment 132 of building 110. In one or more embodiments, building 110 may include various devices that transmit signals or energy at one or more RF frequencies, whether intentionally transmitting RF communication signals or unintentionally radiating energy at or near RF .frequencies. For example, building 110 may include a television 116 that may transmit and/or radiate RF energy 124 capable of being detected by information handling system 112. In another example, a microwave oven 118 may radiate RF energy 126 capable of being detected by information handling system 112. As further examples, building 110 may include a cordless telephone 120 emitting RF communication signals 128, and/or a personal computer (PC) 122 having a wireless local area network (WLAN) adapter and/or a wireless wide area network (WWAN) adapter capable of transmitting RF communication signals 130, for example, WLAN signals in compliance with an Institute of Electrical and Electronics Engineers (IEEE) 802.11 a/b/g/n standard, a Bluetooth standard, an Ultra Wideband (UWB) standard, or the like, and/or WWAN signals in compliance with an IEEE 802.16 standard, a Worldwide Interoperability for Microwave Access (WiMAX) standard, a Third Generation Partnership Plan (3GPP) standard, and so on, although the scope of the claimed subject matter is not limited in this respect.

In one or more embodiments, information handling system 112 includes an RF spectrum scanner capable of searching for anomalies in the ambient RF environment 132 for detection of physical activity of a monitored individual based on the individual using or operating various devices in building 110. Such an RF spectrum scanner is capable of continually, or occasionally, scanning the RF spectrum within building 110 for anomalous RF signals or energy having levels above the level ambient RF background noise in the RF ambient environment 132. When an anomaly is detected by information handling system 112, the resultant detected RF signature in question may then be compared to a database of one or more known and/or recognized RF signatures. Such a database may be stored locally in information handling system 112, or optionally stored in a remote information handling system coupled to information handling system 112 via a network such as the Internet. An inference engine, which may be tangibly embodied as a computer program or instructions capable of being executed by information handling system 112, is capable of utilizing RF signature data detected in RF ambient environment 132 as primary and/or corroborating data in the assessment of Activities of Daily Living (ADL) of the one or more monitored individuals. Such an interference engine may be based at least in part on standard machine learning or correlation techniques, although the scope of the claimed subject matter is not limited in this respect.

In one or more embodiments, an example of how information handling system 112 may be utilized to implement ADL monitoring may be as follows. An individual in building 110 may use cordless telephone 120 to make a telephone call. Cordless telephone 120 emits an RF signal during operation, for example, for communication between the handset and the base of cordless telephone in accordance with a Digital Enhanced Cordless Telecommunications (DECT) standard. The RF signal 128 emitted by cordless telephone 120 may comprise an RF signal having an operational frequency ranging from about 1.92 GHz to about 1.93 GHz. Such an RF signal 128 is capable of being detected by the RF scanner of information handling system 112, which may be detected as a signature based at least in part on the signal level, signal frequency, signal power, and so on. The signature of RF signal 128 is forwarded from the RF scanner of information handling system 112 to an interpreter, which may comprise a computer program or instructions executed at least in part by a processor of information handling system 112, and/or at least in part by circuitry or logic devices of information handling system 112. The interpreter may determine if the detected signature is valid and registered, that is having previously been determined to exist in the known environment of building 110. As cordless phone 120 may have a recognized signature, the inference engine can make the decision that someone in building is using cordless phone 120. The detected activity may be time stamped by information handling system 112 and recorded in a database for future access by information handling system 112 or some other device or user, although the scope of the claimed subject matter is not limited in this respect.

In one or more embodiments, if the detected RF signature is recognized, but not registered in the environment of building 110, an annotation may be made in the database of the presence of that signal for later analysis and/or for possible inclusion in future decisions. For example, an individual inhabiting building 110 may purchase a new microwave oven 118 that was not previously known to exist in building 110 by information handling system 112. In one or more embodiments, the signature of a microwave oven 118 may be known to information handling system 112, for example, the signature of a microwave oven may be stored in the database, but not specifically registered as a known entity of building 110. If such a new signature of a previously unregistered device having a known signature in the database is detected by information handling system 112, an assumption may be made that there is a new microwave oven 118 in building 110. In one or more embodiments, the assumption may be confirmed to verify the correctness of the assumption. In the event it can be confirmed that there is a new microwave oven 118 in building 110, microwave oven 118 may be registered as a known entity in the database, and the signature of the new microwave oven 118 may be utilized in future decision processes. However, in the event a new RF signature is not recognized by information handling system 112, the new RF signature may be recorded in the database for characterization. Once a device is characterized it can be included in the database of known signatures to be included in all future detections, although the scope of the claimed subject matter is not limited in this respect.

In one or more embodiments, monitoring system 100 may involve the installation of an RF sweeping receiver as information handling system 112 without requiring additional monitoring devices or equipment in building 110 and/or on the body of a monitored individual. Thus, monitoring system 100 may involve a reduced installation complexity, cost and/or invasiveness to the environment of building 110 and/or the monitored individuals. Using monitoring system 100, capturing RF signatures in such a non-invasive manner allows the user to make changes to aspects of their living environment and/or daily activities without adversely affecting the performance of monitoring system 100, for example without requiring recalibration or adjustment of monitoring system after such changes to the environment or daily activities, although the scope of the claimed subject matter is not limited in this respect.

In one or more embodiments, any device that emits RF signals or energy may be utilized as part of monitoring system 100. For example, in addition to the discussed examples of a television 116, microwave oven 118, cordless telephone 120, or personal computer 122, other devices capable of being monitored by monitoring system 100 may include lights, fans, motors, wireless doorbells, remote controls, cellular telephones, personal digital assistants, gaming devices, alarm systems, and so on. The RF emissions of such devices may be detectable by information handling system 112 without requiring the use of discrete sensors or other devices. Furthermore, in one or more embodiments one or more additional specific RF emitting devices may be introduced into building 110 for enhanced data collection, for example a device having a unique, customizable RF signature that emits an RF signal in response to a discreet action by a monitored individual. For example, such a device may be attached to a door and may be capable of emitting an RF signal when the door is opened or closed. In one or more embodiments, information handling system 112 is capable of mapping raw RF signatures present in RF ambient environment 132 of building 110 to take into account RF interference and/or fringing effects to take such interference and/or infringing effects into account when monitoring the RF signatures of the various devices in building. For example, the RF signals emitted by the devices may be attenuated by walls, furniture, or other architectural features of building 110 which information handling system 112 may take into account. Furthermore, the complexity and/or customization of the system may be contained on the host side, that is on information handling system 112. As a result, most or all of the processing and maintenance of monitoring system 100 may be limited to a single device that is capable of operating based on the potentially any device capable of emitting an RF signature on the client side, although the scope of the claimed subject matter is not limited in this respect.

Figure 2:
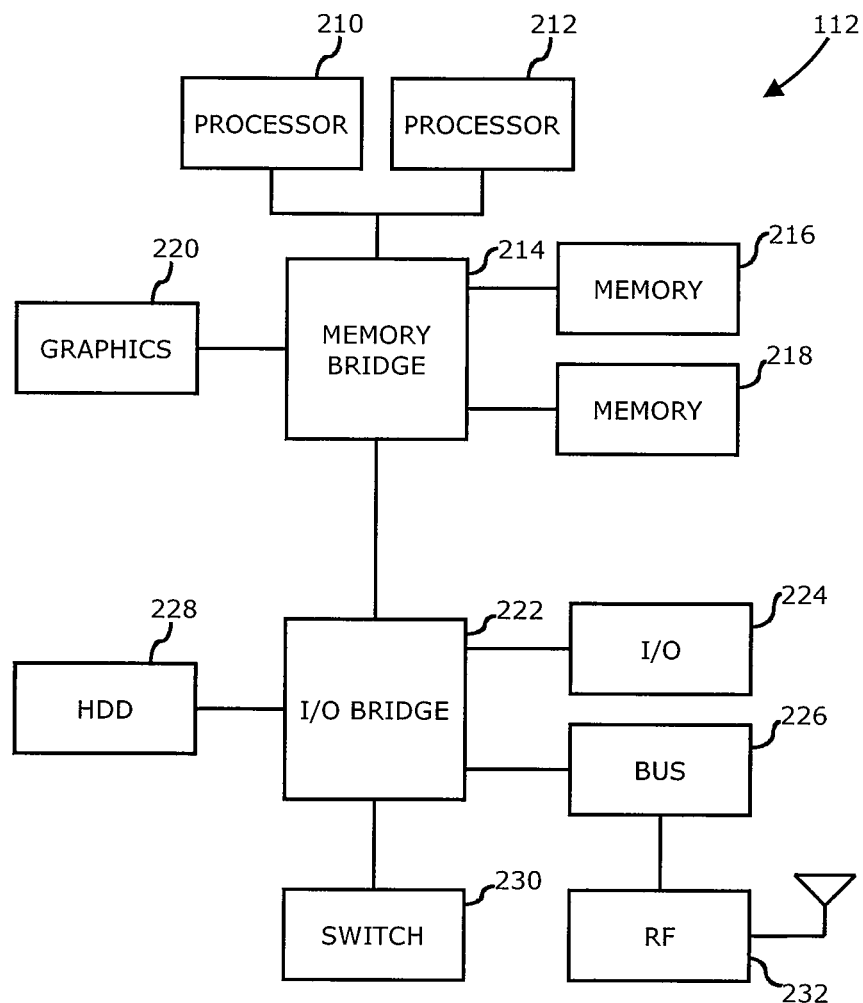
FIG. 2 is a block diagram of an information handling system capable of monitoring a radio-frequency ambient environment in accordance with one or more embodiments.

Referring now to FIG. 2, a block diagram of an information handling system capable of monitoring a radio-frequency ambient environment in accordance with one or more embodiments will be discussed. Information handling system 112 as shown in FIG. 2 may tangibly embody monitoring system 100 of FIG. 1. Although information handling system 112 represents one example of several types of computing platforms, information handling system 112 may include more or fewer elements and/or different arrangements of elements than shown in FIG. 2, and the scope of the claimed subject matter is not limited in these respects.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

As discussed herein, a process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

In one or more embodiments, information handling system 112 may comprise one or more processors, such as processor 210 and/or processor 212, which may comprise one or more processing cores. One or more of processor 210 and/or processor 212 may couple to one or more memories 216 and/or 218 via memory bridge 214, which may be disposed external to processors 210 and/or 212, or alternatively at least partially disposed within one or more of processors 210 and/or 212. Memory 216 and/or memory 218 may comprise various types of semiconductor-based memory, for example, volatile-type memory and/or non-volatile-type memory. Memory bridge 214 may couple to a graphics system 220 to drive a display device (not shown) coupled to information handling system 112.

Information handling system 112 may further comprise input/output (110) bridge 222 to couple to various types of 110 systems. I/O system 224 may comprise, for example, a universal serial bus (USB) type system, an IEEE-1394-type system, or the like, to couple one or more peripheral devices to information handling system 112. Bus system 226 may comprise one or more bus systems such as a peripheral component interconnect (PCI) express type bus or the like, to connect one or more peripheral devices to information handling system 112. A hard disk drive (HDD) controller system 228 may couple one or more hard disk drives, or the like, to information handling system, for example, Serial ATA type drives or the like, or alternatively a semiconductor-based drive comprising flash memory, phase change, and/or chalcogenide-type memory, or the like. Switch 230 may be utilized to couple one or more switched devices to I/O bridge 222, for example, Gigabit-Ethernet-type devices, or the like. Furthermore, as shown in FIG. 2, information handling system 112 may include a radio-frequency (RF) block 232 comprising RF circuits and devices for wireless communication with other wireless communication devices of monitoring system of FIG. 1. For example, RF block 232 may include an RF scanner capable of scanning the RF ambient environment 132 of building 110, although the scope of the claimed subject matter is not limited in this respect.

Figure 3:
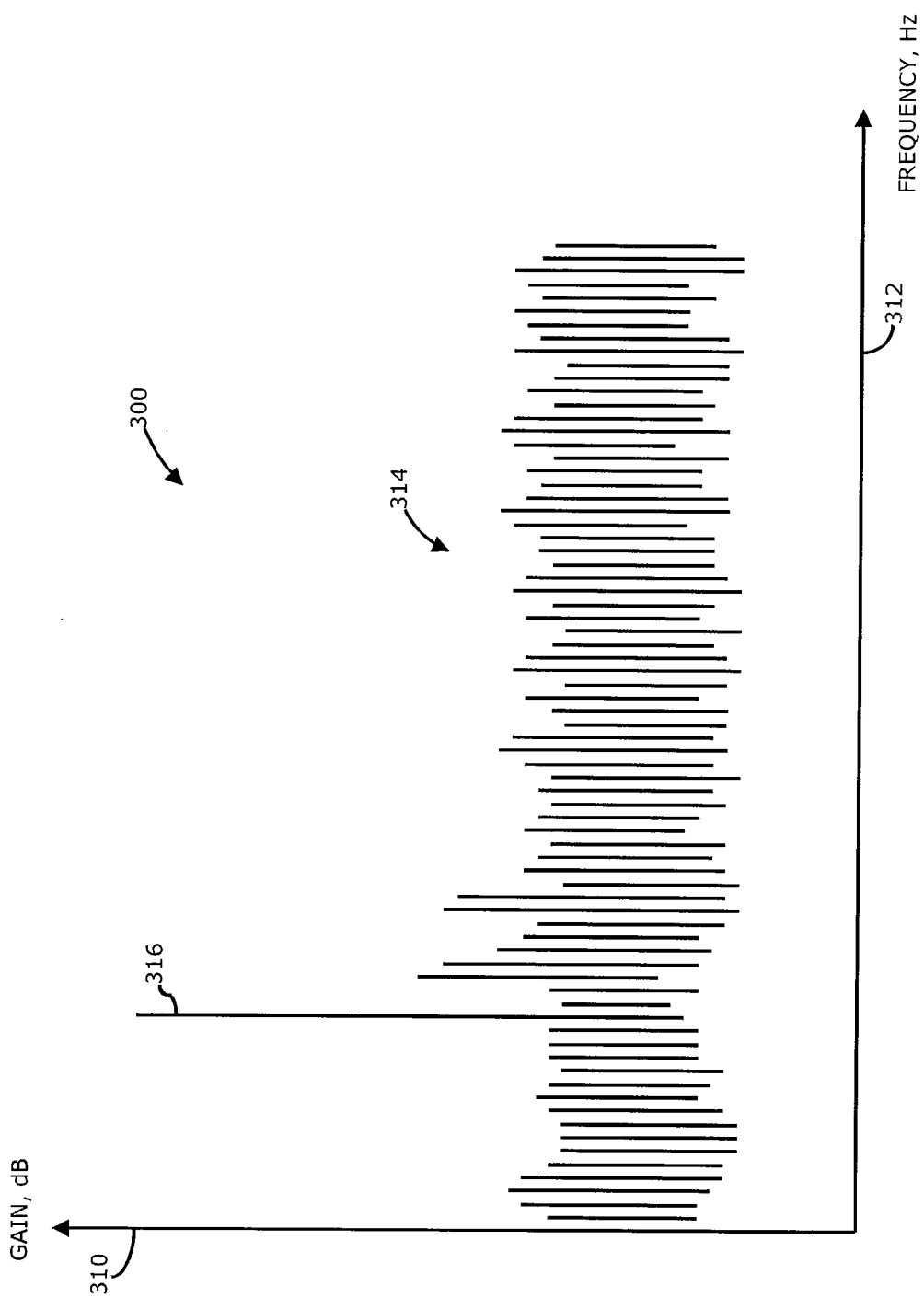
FIG. 3 is a plot of a radio-frequency spectrum of a building such as a house in accordance with one or more embodiments.

Referring now to FIG. 3, a plot of a radio-frequency spectrum of a building, such as a house in accordance with one or more embodiments will be discussed. As shown in FIG. 3, plot 300 may represent RF signals and/or emissions present in RF ambient environment 132 of building 110. The gain or level of such RF signals measured in decibels (dB) is plotted on the vertical axis 310 with versus frequency measured in Hertz (Hz) on the horizontal axis 312. The spectrum of plot 300 may generally represent background RF noise 314 present in RF ambient environment 132. In one particular example, when an individual in building 110 operates cordless phone 120, cordless phone 120 may emit an RF signal 316 at a given frequency and having a given magnitude which is typically much greater than the average level of background RF noise 314. Thus, information handling system is capable of detecting signal 316 and discriminating signal 316 from background RF noise 314. Furthermore, signal 316 may be indicative of a unique RF signature, as one example, an emission from a device may exhibit a magnitude in a known range and at a known frequency from which information handling system 112 is capable of identifying signal 316 as being unique cordless phone 120. As a result, the usage of cordless phone 120 may be logged into a database by information handling system 112 along with the time and duration that cordless phone was used by the individual. Such processing of RF signals detected by information handling system may occur according to a method a discussed with respect to FIG. 4, below. It should be noted that the example shown in FIG. 3 is merely one example of signal emitted from a device in building 110, and that a characteristic signal emitted from a device may have frequency components at one or more frequencies having various magnitudes relating to the type of signal emitted, for example, an emitted signal may have a particular Fourier series of frequency components over a certain bandwidth, In one or more embodiments, information handling system 112 may be capable of performing one or more signal processing functions as a part of the process by which a device in building 110 may be identified, for example, decoding, demodulating, Fourier transforming, Fast Fourier Transforming, Inverse Fourier Transforming, Inverse Fast Fourier Transforming, correlating, and so on, and the scope of the claimed subject matter is not limited in this respect. Furthermore, RF emission from devices of building 110 may have one or more components and/or characteristics that may be utilized by information handling system 112 to identify the particular device. For example, such characteristics may include, but are not limited to, frequency, frequency components, magnitude, bandwidth, time and/or time delay, phase shift, modulation, packet headers, packet data, guard intervals, time division, code division, multiplexing characteristics, fading, error correction, coding, retransmissions, and so on, and the scope of the claimed subject matter is not limited in this respect. In addition, multiple devices in building 110 may radiate multiple emissions in RF ambient environment 132 such that the emissions may be superimposed into an overall combined signal. Even is such an environment, information handling system 112 may be capable of discriminating any one or more of the characteristic emission from any one or more of the devices in building 110 based at least in part on any one or more of the characteristics of the RF emissions so that any one or more devices in building 110 may be identified by information handling system 112, and the scope of the claimed subject matter is not limited in this respect.

Figure 4:
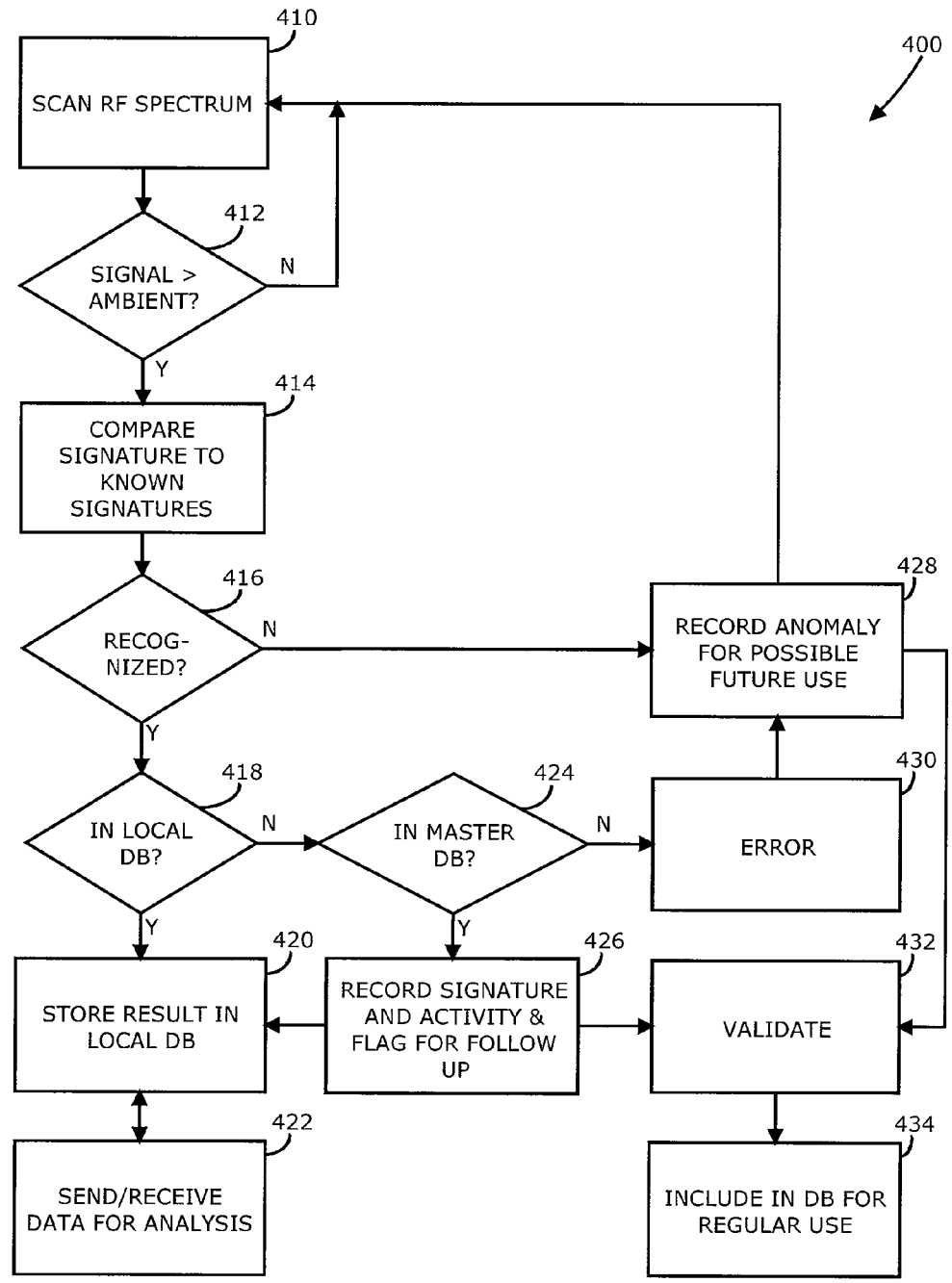
FIG. 4 is a flow diagram of a method for monitoring a radio-frequency ambient environment in accordance with one or more embodiments.

Referring now to FIG. 4, a flow diagram of a method for monitoring a radio-frequency ambient environment in accordance with one or more embodiments will be discussed. Method 400 of FIG. 4 may be implemented by information handling system 112 as part of monitoring system 100 as one example method by which the activities of daily living (ADL) of one or more individuals inhabiting building 110 may be monitored. Although FIG. 4 shows one particular example of method 400, method 400 may alternatively include more or fewer blocks than shown in FIG. 4, and furthermore other orders of the blocks of method 400 may be implemented, and the scope of the claimed subject matter is not limited in this respect.

In one or more embodiments, information handling system 112 may scan the RF spectrum at block 410 corresponding to RF ambient environment of building 110 to detect one or more RF signals or emissions. During scanning, a determination may be made at decision block 412 whether a detected RF signal is greater than the RF background noise 314 of RF ambient environment 132. If a detected RF signal is not greater than RF background noise 314, information handling system 112 may continue to scan the RF ambient environment. If a detected RF signal is greater than RF background noise, a comparison may be made at block 414 between the detected RF signal and one or more known RF signatures stored in a database. A determination may then be made at decision block 416 whether the detected RF signature is recognized, that is the detected RF signal matches a known RF signature of the database. In the event the detected RF signal is not recognized, the RF signal may be recorded at block 428 as an anomaly and may optionally be processed for possible future use in the database as a new device type that has not been previously recognized.

In the event the detected RF signal is recognized as a known device, a determination may be made at decision block 418 whether the recognized device is stored in the local database of devices known to be present in building 110. If the recognized device is not found in the local database, a determination may be made at decision block 424 whether the device is found in a master database of devices. In the event the recognized device is not found the master database, an error may be logged at block 430, and the error may be logged at block 428 as an anomaly for possible future use. However, in the event the recognized device is found in the master database, the signature and activity of the recognized device may be recorded at block 426 and flagged for future follow up. The recognized device may be added to the local database at block 420 and registered as a device present in building 110. Furthermore, the recognized device optionally may be validated at block 432 to determine at whether the device should remain included in the database for regular usage. For example, a new device may be permanently introduced into building 110 that may be used by monitored individuals as part of their daily activities, for example, if a new microwave oven 118 is purchased and installed in the kitchen. Alternatively, it may be determined at block 434 that the recognized device is a cellular telephone of a visitor that likely will not be present in building 110 in the future. In such a case, block 434 may determine that the cellular telephone should not be included in the local database after the visitor leaves building 110. Such validation 432 and/or inclusion determination 434 may be handled in real-time or near real-time by information handling system 112, or alternatively may be handled offline or at some point in the future after detection of such a recognized device, although the scope of the claimed subject matter is not limited in this respect.

In one or more embodiments, if it is determined at decision block 418 that the recognized device recognized at decision block 416 is found in the local database, then the result may be stored in the local database, for example, usage of the recognized device may be logged and time stamped in the local database. Such logged usage of the devices of building 110 may be analyzed as part of the ADL monitoring of the individuals inhabiting building 110, for example analyzed by an interference engine as described herein. In one or more embodiments, such analysis may be performed locally by information handling system 112, or may be performed by a remote device or person capable of communicating with information handling system 112 and receiving the data logged by information handling system 112, in a real-time or near real-time process or in a future or offline process, for example, in which the data may be stored, batched, or transmitted to a remote device or person, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to monitoring activities of daily living using radio frequency emissions and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:

passively scanning an RF spectrum of the RF ambient environment of a building;

detecting an RF signal in the scanned RF spectrum emitted from a device in the building, the detected RF signal comprising an RF signature of the device as the device is operated or used by a user;

determining an identity of the detected device by finding the RF signature of the detected RF signal in a local database of known device RF signatures in the RF ambient environment of the building and obtaining a device identification associated with the RF signature in the local database, wherein determining the identity of the detected device comprises determining a device type of the detected device based on the RF signature of the device;

if the RF signature of the detected RF signal is found in the local database, storing, in a log of activities occurring in the building, usage information of the detected device as the detected device is operated or used by the user; and analyzing the log of activities occurring in the building to determine a status of the user in the building.

2. The method as claimed in claim 1, further comprising executing said determining if the detected RF signal has a level greater than a level of RF ambient background noise in the building.

3. The method as claimed in claim 1, further comprising recording an anomaly if the RF signature of the detected RF signal does not match any known device RF signature in the local database.

4. The method as claimed in claim 1, wherein the determined device type is a personal computer, a motor, a fan, a gaming device, a personal digital assistant, a remote control, a phone, a television, a microwave, a light, an alarm, or a wireless doorbell.

5. The method of claim 1, further comprising determining, if the RF signature of the detected RF signal is not found in the local database, whether the RF signature of the detected RF signal is found in a master database; and
recording in the local database, if the RF signature of the detected RF signal is found in the master database, a device identification that is associated with the RF signature in the master database.

6. The method as claimed in claim 3, further comprising determining, if the RF signature of the detected RF signal does not match the known device RF signatures stored in the local database, if the RF signature of the detected RF signal matches a known device RF signature stored in a master database, and if the RF signature of the detected RF signal does not match any known device RF signature stored in the master database, logging an error.

7. The method as claimed in claim 1, further comprising implementing an inference engine to analyze the log of activities occurring in the building to determine a status of the user in the building.

8. An apparatus, comprising:
an RF scanner coupled to an antenna to passively scan the RF spectrum in the RF ambient environment of a building; and
a processor coupled to said RF scanner, said processor being capable of:
detecting an RF signal in the scanned RF spectrum emitted from a device in the building, the detected RF signal comprising an RF signature of the device as the device is operated or used by a user,
determining a device type of the detected device based on determining an identity of the device by finding the RF signature of the detected RF signal in a local database of known device RF signatures in the RF ambient environment of the building and obtaining a device identification associated with the RF signature in the local database,
if the RF signature of the detected RF signal matches a known device RF signature in the database, storing, in a log of activities occurring in the building, usage information of the detected device as the detected device is operated or used by the user, and
analyzing the log of activities occurring in the building to determine a status of the user in the building.

9. The apparatus as claimed in claim 8, wherein the processor is further capable of executing said determining if the detected signal has a level greater than a level of RF ambient background noise in the building.

10. The apparatus as claimed in claim 8, wherein the processor is further capable of recording an anomaly if the RF signature of the detected RF signal does not match any known device RF signature in the local database.

11. The apparatus as claimed in claim 8, wherein the processor is capable of implementing an inference engine to analyze the log of activities occurring in the building to determine a status of an individual in the building.

12. The apparatus as claimed in claim 8, wherein the processor is further capable of
determining, if the RF signature of the detected RF signal is not found in the local database, whether the RF signature of the detected RF signal is found in a master database, and
recording in the local database, if the RF signature of the detected RF signal is found in the master database, a device identification that is associated with the RF signature in the master database.

13. The apparatus as claimed in claim 10, wherein the processor is further capable of determining, if the RF signature of the detected RF signal does not match the known device RF signatures stored in the local database, if the RF signature of the detected RF signal matches a known device RF signature in a master database, and if the RF signature of the detected RF signal does not match any known device RF signature stored in the master database, logging an error.

14. The apparatus according to claim 8, wherein the device type is a personal computer, a motor, a fan, a gaming device, a personal digital assistant, a remote control, a phone, a television, a microwave, a light, an alarm, or a wireless doorbell.

15. The method as claimed in claim 1, wherein the scanned RF spectrum comprises a frequency range that is from 1.92 GHz to 1.93 GHz.

16. A method, comprising:
scanning an RF spectrum of the RF ambient environment of a building;
detecting an RF signal in the scanned RF spectrum emitted from a device in the building, the detected RF signal comprising an RF signature of the device as the device is operated or used by a user;
determining an identity of the detected device by finding the RF signature of the detected RF signal in a local database of known device RF signatures in the RF ambient environment of the building and obtaining a device identification associated with the RF signature in the local database, wherein determining the identity of the detected device comprises determining a device type of the detected device based on the RF signature of the device;
if the RF signature of the detected RF signal is found in the local database, storing, in a log of activities occurring in the building, usage information of the detected device as the detected device is operated or used by the user; and
analyzing the log of activities occurring in the building to determine a status of the user in the building.

17. The method of claim 16, further comprising determining, if the RF signature of the detected RF signal is not found in the local database, whether the RF signature of the detected RF signal is found in a master database;
recording in the local database, if the RF signature of the detected RF signal is found in the master database, a device identification that is associated with the RF signature in the master database.

18. An apparatus, comprising:
an RF scanner coupled to an antenna to scan the RF spectrum in the RF ambient environment of a building; and
a processor coupled to said RF scanner, said processor being capable of:
detecting an RF signal in the scanned RF spectrum emitted from a device in the building, the detected RF signal comprising an RF signature of the device as the device is operated or used by a user, determining a device type of the detected device based on determining an identity of the device by finding the RF signature of the detected RF signal in a local database of known device RF signatures in the RF ambient environment of the building and obtaining a device identification associated with the RF signature in the local database, if the RF signature of the detected RF signal matches a known device RF signature in the database, storing, in a log of activities occurring in the building, usage information of the detected device as the detected device is operated or used by the user, and analyzing the log of activities occurring in the building to determine a status of the user in the building.

19. The apparatus as claimed in claim 18, wherein the processor is further capable of determining, if the RF signature of the detected RF signal is not found in the local database, whether the RF signature of the detected RF signal is found in a master database;

recording in the local database, if the RF signature of the detected RF signal is found in the master database, a device identification that is associated with the RF signature in the master database.

* * * * *